3,482,405
RAPID DUMP VALVE
Vincent J. Sansevero, Jr., East Hartford, Conn., assignor to United Aircraft Corporation, East Hartford, Conn., a corporation of Delaware
Filed Apr. 13, 1967, Ser. No. 630,568
Int. Cl. F02k 3/10, 3/12; B64c 15/06
U.S. Cl. 60—263                                                                          1 Claim

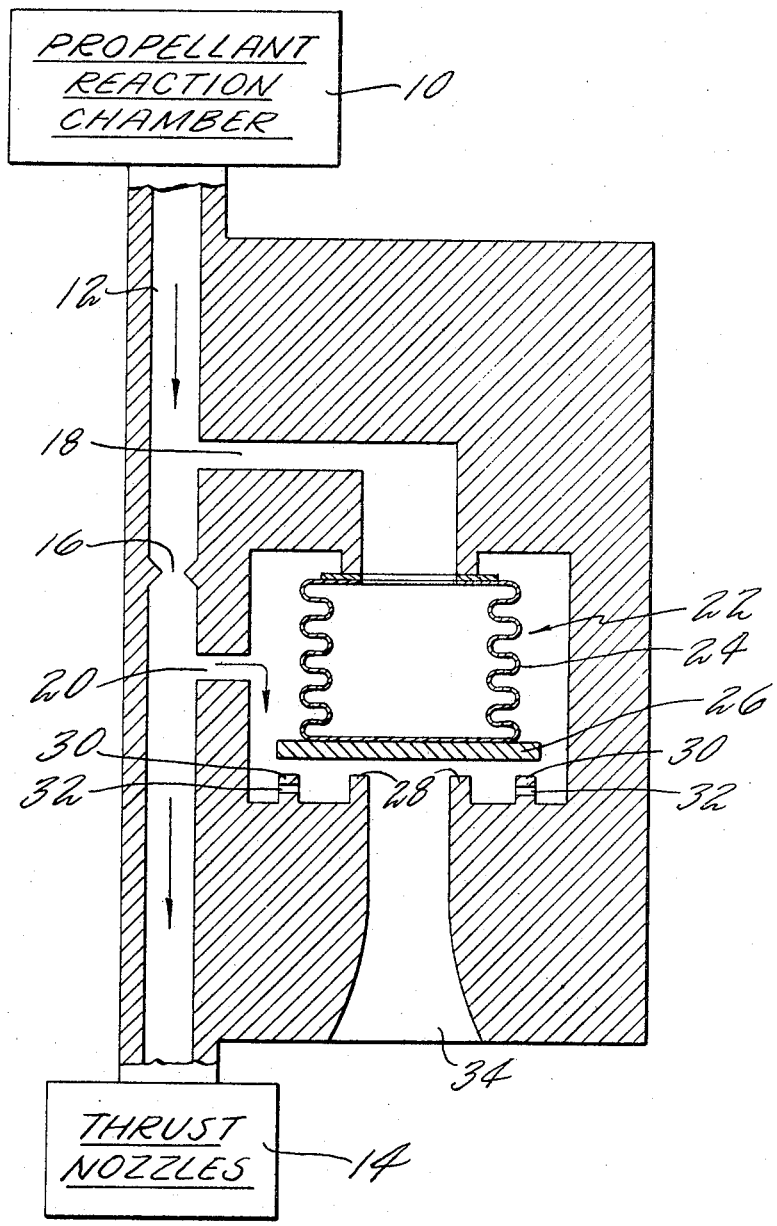

ABSTRACT OF THE DISCLOSURE

A bellows supports and aids in controlling a valve poppet in response to pressure differences developed on opposite sides of a pressure control orifice in the discharge line of a reaction control nozzle of a low thrust rocket engine. The normally open valve senses a change in the reaction chamber pressure occurring during termination of thrust and opens in response to lower pressure so as to rapidly vent the flow at the nozzles downstream of the pressure control orifice to an ambient environment, thus reducing the effect of residual decomposition of propellant in the reaction chamber (such as liquid hydrazine in a catalyst).

BACKGROUND OF THE INVENTION

Field of the invention

This invention relates to fluid valves and more particularly to a rapid dump valve.

Description of the prior art

As known in the art of monopropellant reaction control systems, a common form of thrust generation includes the injection of a liquid propellant, such as hydrazine, into a reaction chamber to produce gas at a given rate of generation. In order to produce gas at a sufficient rate, a finite quantity of liquid propellant must exist within the reaction chamber during thrust operation. However, when thrust is to be terminated, the flow of propellant into the reaction chamber may readily be turned off, but the finite quantity of propellant within the reaction chamber at that time continues to decompose and, therefore, produce gas over some period of time. This creates an undesirably long tailoff in thrust. This problem is more acute in the control of small monopropellant reaction control systems.

SUMMARY OF INVENTION

An object of the present invention is to mitigate the effects of residual gas generation in terminating the effects thereof.

According to the present invention, a dump valve senses a lowering of pressure (such as in the reaction chamber of a rocket engine), to bypass to ambient gases generated during the turnoff of gas generation in gas utilization means. The normally open valve is controlled solely by the pressures in the discharge line of a gas generator, automatically closing in response to sufficient pressure (during startup of the operation), and automatically opening during termination of operation in response to a lowering of pressure.

In accordance with further aspects of the present invention, the valve includes a spring bellows which is in fluid communication with the output of the gas generator, and a poppet which is in fluid communication with the duct work which supplies gas to the gas utilization means. Between these two inlets to the valve, there is a flow restriction, so that the valve is operative in response to pressure differences developed across the orifice.

The invention is so configured that the flow of hot gases through the valve poppet per se occurs only during startup and shutdown of the operation, no gas flow occurring through the rapid dump valve in accordance herewith during normal operating conditions.

The device in accordance herewith is relatively simple and can provide a high degree of controlled operation at a relatively low cost.

BRIEF DESCRIPTION OF THE DRAWING

The sole figure herein is a cross sectioned elevation of a thrust termination valve in accordance with the present invention.

DESCRIPTION OF THE PREFERRED EMBODIMENT

Referring to the figure, a gas generator, such as a propellant reaction chamber 10, is interconnected by fluid communication means, such as a pipe or duct 12, to a pressure utilization means such as thrust nozzles 14. Within the duct 12 is a flow restriction such as a pressure control orifice 16, and communication means, such as an upstream inlet 18 and a downstream inlet 20, which communicate pressure differentials developed across the orifice 16 to a valve indicated generally as 22. The valve 22 comprises a generally cylindrical bellows spring 24 and a circular poppet 26 which is disposed for operation with two annular seats 28, 30. The inner seat 28 cooperates with the poppet 26 to provide the sealing action of the valve. The outer seat 30 operates only as a load-bearing surface. As configured herein, the outer seat 30 may be of a stilted design so as to provide a plurality of vents 32 throughout the seat 30 so as to permit communication of fluid pressure through the seat 30 to the area of poppet 26 in contact with the seat 28, when the valve is closed. The output of the valve 22 vents to ambient by means of a duct 34.

Consider the operation of the device starting with the valve open (as shown in the figure) at a time when the propellant reaction chamber 10 is starting to produce thrust inducing gases. Initially, because the valve 22 is normally open, there is no pressure developed downstream of the orifice 16; however, pressure will develop upstream of the orifice 16 so as to tend to force the poppet 26 into sealing engagement with the seat 28 against the forces of the spring bellows 24. The expansion coefficient of the spring 24 and size of the orifice 16 are so adjusted that sufficient pressure will be developed in the area of the upstream inlet 18 so as to close the poppet 26 against the seat 28. Once the poppet 26 is sealed against the seat 28, then pressure will begin to build up on the downstream side of the orifice 16, thus supplying fluid pressure to the thrust nozzles 14, and concomitantly causing a decrease in the pressure drop across the orifice 16. With the orifice 16 adjusted to the proper size, it will choke when the valve is open, but will not choke once the valve has closed.

During the termination of thrust, when fresh propellant is no longer being fed into the propellant reaction chamber 10, gases are still being supplied to the duct 12 but at a lower rate so that there is a lower pressure at the output of the reaction chamber 10. When the pressure reaches a sufficiently low value, the valve 22 will begin to unseat, permitting fluid to seep around the seat 28, thus supplying fluid at the pressure of the downstream inlet 20 to the full face of the poppet 26, thus causing the valve to open very rapidly. When the valve is open, the fluid is nearly all rapidly vented through the duct 34 to ambient, thus rapidly terminating thrust generated in the thrust nozzles 14. Since the downstream inlet 20 is near the thrust nozzles 14 and at nearly the same pressure, the back pressure caused by the nozzles aids in dumping gases through the valve, thereby bypassing the nozzles.

Having thus described a preferred embodiment of my invention, what I claim as new and desire to secure by Letters Patent of the United States is:

1. A dump valve for rapidly terminating the effect of high temperature pressurized gases in rocket thrust nozzles, said dump valve adapted to be inserted serially between a high temperature fluid pressure generating means and the nozzles, comprising:

a main duct adapted for connection between the generating means and the nozzles, said duct having a flow restriction therein;

a main chamber external to said main duct connected in fluid communicating relationship to said main duct at a point downstream of said flow restriction;

an ambient duct leading from said main chamber to ambient;

pressure sensitive valve means comprising a poppet disposed on a spring bellows located within said chamber so as to form a fluid-tight sub-chamber, said sub-chamber connected in fluid communicating relationship with said duct upstream of said flow restriction, said valve means normally closing off said ambient duct when the pressure differential across said flow restriction is greater than a given magnitude above which thrust is to be developed by said nozzles, the flow of gases from the generating means to said fluid pressure utilization device being through said main duct exclusively so that flowing gas does not contact said bellows or said poppet when said valve means is closed, said valve rapidly opening to permit a flow of gas from said main duct through said main chamber to said ambient duct in response to a predetermined pressure differential lower than said given magnitude, to thereby rapidly dump, to an ambient environment, fluid in the duct downstream of said flow, thereby to rapidly terminate thrust created by said nozzles in response to residual gas pressure.

References Cited

UNITED STATES PATENTS

| | | | |
|---|---|---|---|
| 2,916,047 | 12/1959 | Butcher | 137—501 |
| 3,282,323 | 11/1966 | Katz | 137—501 |
| 1,934,758 | 11/1933 | Temple | 137—117 X |
| 3,128,783 | 4/1964 | Cowles | 137—117 |

WILLIAM F. O'DEA, Primary Examiner

HOWARD M. COHN, Assistant Examiner

U.S. Cl. X.R.

137—117, 501; 239—265.11, 265.43